Jan. 19, 1937.  R. M. NARDONE  2,068,462
ENGINE STARTING APPARATUS
Filed Nov. 12, 1932
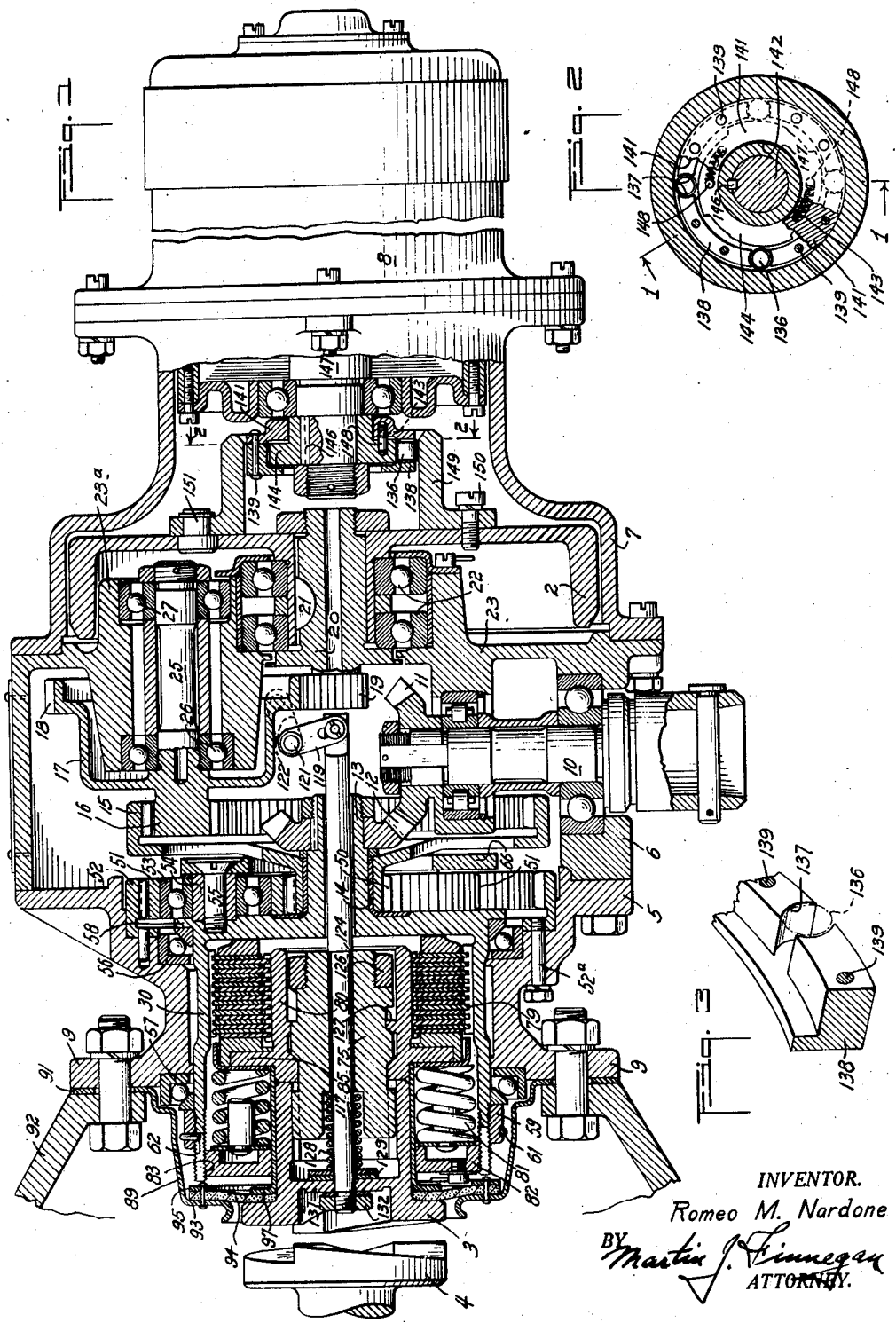
INVENTOR.
Romeo M. Nardone
BY Martin J. Finnegan
ATTORNEY.

Patented Jan. 19, 1937

2,068,462

UNITED STATES PATENT OFFICE 2,068,462

ENGINE STARTING APPARATUS

Romeo M. Nardone, East Orange, N. J., assignor, by mesne assignments, to Eclipse Aviation Corporation, East Orange, N. J., a corporation of New Jersey Application November 12, 1932, Serial No. 642,449

9 Claims. (Cl. 123—179)

This invention relates to engine starting apparatus, and more particularly though not exclusively to means of the inertia type for starting internal combustion engines.

It is now common practice in this art to employ a small high speed flywheel as a reservoir for the storage of energy, and to utilize energy stored therein for starting an internal combustion engine. Devices of this character have, in certain instances, embodied manually operable means for rotating the flywheel at high speed, and have also embodied power means, such as an electric motor, for actuating the flywheel.

It is an object of this invention to provide in a starting mechanism of the above type, novel means for drivably connecting the power motor with the flywheel, whereby the latter may be rotated.

Another object is to provide a novel automatically operating overrunning clutch mechanism for drivably connecting the source of power, such as an electric motor, with a rotatably mounted driven member.

A one-way clutch has been employed heretofore to drivably connect the motor and flywheel of inertia starters, but in all such prior uses, the clutch has been of the conventional type in which the rollers remain in constant contact with both the inner and outer races of the clutch, even when running freely. If such a conventional overrunning clutch were to be employed in an inertia starter of the character disclosed in the Lansing Patent No. 1,691,820, a type extensively used in the art, difficulty would be encountered in accelerating the flywheel through the manual means, and there would be further difficulty in attempting to demesh the engine engaging member in the event of a failure of the engine to start. In inertia starters of this type, demeshing is effected through the instrumentality of a rod which passes centrally through a screw shaft and operates to withdraw such screw longitudinally. In the process of such longitudinal withdrawal, the threads of the screw shaft operate to impart a rotary movement to the surrounding internally threaded sleeve. This rotary movement is in a direction opposite to the normal direction of cranking. Moreover, this reverse rotation is transmitted back through the gearing to the flywheel at a considerably multiplied rate and is therefore effective to cause a substantial reverse rotation of the latter member. Now if a conventional roller clutch were to be employed as the driving connection between the starting motor and the flywheel, any such reverse rotation of the flywheel would cause a jamming or wedging of the rollers of the clutch and thus subject the parts to the considerable resistance offered by the friction of the brushes and other parts of the motor. This would make it exceedingly difficult, if not virtually impossible, for the operator to effect demeshing through the manually operable meshing and demeshing rod above referred to.

The present invention seeks to overcome the foregoing difficulties by providing a novel form of connection characterized by the provision of means permitting the driving rollers to move entirely out of contact with the driven element of the clutch as soon as the driving motor is de-energized, and further characterized by the fact that these rollers remain permanently out of contact with all driven parts during manual operation, so that the flywheel may run comparatively freely in either direction without encountering any resistance from the motor parts.

Only one embodiment of the present invention is shown in the accompanying drawing, but it is to be expressly understood that the drawing is for the purpose of illustration only and is not designed as a definition of the limits of the invention, reference being had for this purpose to the appended claims.

Referring to the drawing,

Fig. 1 is a central longitudinal section of a device embodying the invention;

Fig. 2 is a transverse view showing the element 140 as it appears in section along the plane 2—2 of Fig. 1 and also showing the element 141 as it appears in section along a plane somewhat to the right of the plane 2—2 of Fig. 1; and showing other parts of the clutch as they appear when viewed in one or the other of the two planes just referred to; and Fig. 3 is a fragmental view in perspective of a detail of the novel clutch mechanism.

Referring to the drawing, there is disclosed a combined hand and power actuated starter of the conventional inertia type. As shown, the starter includes a flywheel 2 constituting the inertia element, and an engine engaging clutch element 3 which is movable into driving engagement with a corresponding clutch member 4 provided on or connecting with the crankshaft or crankshaft extension of the engine to be started. The mechanism is housed within a suitable casing constituted by an inner section 5, intermediate sections 6 and 7, and a motor casing 8, the sections being removably secured together in any suitable manner, and the inner section 5 being provided with a flange 9 to facilitate the mounting of the starter on the engine crankcase, or in any other suitable location.

The manually operable means for actuating the starter preferably takes the form of a cranking shaft 10 rotatably mounted in intermediate housing section 6, with the outer end thereof projecting from said housing, and provided at its inner end with suitable means, such as a bevel pinion 11, for meshing engagement with a similar pinion 12 keyed to a shaft 13 constituting an integral extension of the closed end of barrel 30. The said shaft 13 is further provided with a bushing 14 on which is rotatably mounted the hub of an internally toothed gear 15 coaxially disposed with respect to the flywheel 2, and adapted to mesh with a pinion 16 made integral with a bell shaped member 17 provided at its opposite end with a skirt or flange constituting a spur gear 18 adapted to mesh with a pinion 19, the latter being preferably integral with a stub shaft 20 to which the flywheel 2 is rigidly secured by suitable means, such as the key shown at 21. This stub shaft 20 is rotatably supported, as by ball bearings 22, in a suitable hub on a wall 23 extending across the section 6 of the starter casing. The bell-shaped member 17 is in turn rotatably supported, as by means of a stub shaft 25, bearings 26 and 27, in a compound boss 23a formed on wall 23.

The gear 15 is provided centrally thereof with an integrally formed pinion 50 which constitutes the sun gear for a plurality of planetary gears 51, one of which is shown in section in the drawing, and one in elevation. These planetary gears 51, of which three are preferably employed, spaced at intervals of one hundred and twenty degrees about the sun gear 50, mesh with an internally toothed ring 52 which is rigidly secured in any suitable manner to the inner surface of housing section 6, such as by screws 52a. Each planetary gear is rotatably mounted, as by a bearing 53, on a sleeve 54, the inner end of each sleeve being countersunk in the outer face of the closed end of barrel 30, into which extend screws 55. Barrel 30 is also preferably mounted on bearings, as shown at 56 and 57, the former being held in position by flange 58 of the barrel, and the latter by nut 59 and spring wire 61 clamped thereto, and also to the barrel as indicated at 62. A retaining ring 66 carried by the outer ends of the screws 55 maintains bearings 53 in their proper positions on sleeves 54.

A multiple disc clutch is preferably provided in association with the barrel 30 to insure relative rotary movement between the engine engaging member and the train of gearing above described, whereby the latter is protected from damage due to an excessive shock or load. As shown, the disc clutch comprises a plurality of inter-leaving discs 79, alternately splined to the inner surface of the barrel 30, and the outer surface of a shell 80, internally threaded to engage a correspondingly threaded screw shaft 75, to be further described. Resilient means, such as a plurality of coiled compression springs 81, the pressure of which is adjustable by a nut 82 threadedly engaging the end 83 of the barrel, are provided to press upon a flange 85 on member 80, and thus maintain the discs 79 in frictional engagement with a pressure sufficient to insure transmission of torque from barrel 30 to shell 80, up to a predetermined capacity.

Fitted over the inner end of the starter is a cup-shaped member 89 that is preferably formed of metal and is provided with a flange 91 adapted to be clamped between flange 9 of the starter housing, and the engine flange 92. The inner portion of member 89 is bent inwardly toward clutch member 3, as at 93, and is provided with a central opening which is slightly larger in diameter than the outer diameter of the clutch member 3.

In order to prevent seepage of oil through the central opening in member 89, the latter preferably carries a washer 94 of leather or equivalent material. Normally the inner portion of washer 94 is held in engagement with the adjacent surface of the head of clutch member 3 by means of a metallic washer 95 and a flange sleeve 97.

Rod 117 is axially movable through a central bore in the screw shaft 75 to a limited extent preferably by the means normally employed in inertia starters for actuating the clutch meshing rod. Such means may include the usual shifter fork as shown at 119 in Fig. 1, mounted on the usual transversely disposed shaft 121 oscillated by a suitable lever or bell crank as indicated at 122, and corresponding to that shown at 55 in the Patent No. 1,786,118 granted to Raymond P. Lansing on December 23, 1930.

The rod is reduced in diameter as indicated at 124 to provide a shoulder abutting the end surface of the screw shaft 75, the rod being effective through the instrumentality of said shoulder to move the screw shaft axially until further motion is prevented by engagement of the stop nut 126 with the annular ledge 127 formed at the end of the unthreaded portion of the inner surface of the shell 80. Axial movement of the screw shaft 75 is transmitted yieldably to the engine engaging member through the instrumentality of a coiled compression spring 128 which surrounds the rod 117 and presses upon the washer 129 abutting the transverse portion 131 of the engine engaging member 3. A nut 132 provides means for adjusting the connection between the rod 117 and member 3.

Having now described the construction of a conventional inertia starter of the character to which the present invention is well suited, there remains to be described the novel means for connecting the motor 8 with the flywheel 2. In the form shown, said means includes a roller clutch wherein rollers 136 are of slightly larger diameter than the retaining pockets 137 (Fig. 2) the said pockets being formed in an annular cage 138 suitably connected, as by rivets 139 with a plate 141 having bearing surfaces, as indicated at 142, on the hub of an eccentrically contoured or cammed driving member 144 which is keyed or otherwise rigidly secured, as indicated at 146, to the armature shaft 147 of the motor. A plurality of laterally disposed pins 148 held fast in the driving member 144, are adapted to ride in arcuate pockets in the plate 141 to the extent permitted by springs 143, and thus effect limited motion of the cage and rollers with respect to the cam surfaces on the driving member 144. As shown the pins 148 have no angular play whatever with respect to the driving member 144 in which they are held fast; but the said pins do have a certain amount of angular play with respect to the plate 141, due to the arcuate slots. Such relative angular movement is at first lightly and then more strongly resisted by the springs 143, the resistance of the springs being insufficient, however, to prevent wedging of the rollers 136 at the commencement of the drive. In moving to the wedg- ing position the springs 143 are compressed, thus placing them in condition to subsequently facilitate a return of the rollers to the over-running position by reason of the expanding action of said springs against the pins 148. It will be seen from an inspection of Fig. 2 that the cage is free of the inner circumferential surface of the outer race 149 of the clutch, the latter being screwed or otherwise affixed, as indicated at 150, to the flywheel. A locating pin 151 may first be inserted to insure proper angular relation of the parts.

In operation, when the motor is energized, the slight inertia resistance of the cage causes it to lag behind the driving shaft and the rollers 136 are moved radially outward by the cam surfaces to jam between races 144 and 149, and the drive is transmitted to the flywheel. When the motor is deenergized, the flywheel and race 149 run ahead of the roller cage assembly and tend to drag it along, causing the rollers to move relatively to the inclined cam surface and drop into the deeper portions or depressions in which the cam surfaces terminate. As a result, contact is lost between race 144 and race 149. The flywheel may then come to a stop and reverse its rotation without dragging cage and roller assembly with it.

Smooth engagement is also possible when the motor is accelerated to engage the already rotating flywheel no matter what its speed may be. When the motor arrives at the speed of the flywheel, it begins to drive without any undue noise or sudden jars.

In the event that manual acceleration of the flywheel is resorted to, it will be unnecessary for the operator to exert himself to the degree which would be required were the cage or rollers in constant contact with the surface of the outer race of the clutch, and the process of flywheel acceleration may be carried out without the flywheel's being subject to the resistance inherent in the motor brushes and other friction producing parts.

There is thus disclosed a novel engine starting mechanism embodying the above described features of the present invention and capable of obtaining the above expressed objects. While the embodiment herein shown is of considerable practical merit, it is to be understood that various changes may be made in the construction, arrangement and inter-relation of the parts entering into the invention without departing from the spirit thereof, the extent of the included variations being ascertainable by reference to the broadest of the appended claims.

What is claimed is:

1. In engine starting apparatus of the type having a driven member adapted to mesh with a member of an engine to be started, and embodying a high speed flywheel, means for driving said flywheel including an electric motor and a one-way clutch engageable to energize said flywheel, and means for completely disengaging said one-way clutch to prevent any reverse rotation of said flywheel from being communicated to said driving shaft.

2. In engine starting apparatus of the type having a driven member adapted to move into mesh with a member of an engine to be started, and embodying a high speed flywheel, means including a gear train for drivably connecting said flywheel and driven member, means for demeshing said driven member in the event of failure of the engine to start, means responsive to demeshing to reverse the direction of rotation of said gear train and flywheel, means for driving said flywheel including an electric motor and a one-way clutch engageable to energize said flywheel, and means for completely disengaging said one-way clutch to prevent any reverse rotation from said flywheel from being communicated to said driving shaft.

3. In an engine starter of the type having a driven member adapted to move into mesh with a member of an engine to be started and impart rotary movement thereto in the direction in which said engine normally rotates, means for rotating said driving member including a flywheel and torque transmitting connections between said flywheel and driven member, a driving shaft, a one-way clutch engageable to energize the flywheel in response to initial rotary movement of said driving shaft, and means for completely disengaging said one-way clutch to prevent any reverse rotation of said flywheel from being communicated to said driving shaft.

4. In an engine starter of the type having a driven member adapted to move into mesh with a member of an engine to be started and impart rotary movement thereto in the direction in which said engine normally rotates, means for rotating said driven member including a driving shaft and torque transmitting connections between said driving shaft and driven member, a one-way clutch engageable to energize said torque transmitting connections in response to the initial rotary movement of said driving shaft, and means for completely disengaging said one-way clutch to prevent any reverse rotation of said torque transmitting connections from being communicated to said driving shaft.

5. In an engine starter of the type having a driven member engageable with a member of the engine to be started to crank the latter, and embodying a high speed flywheel for driving said driven member, said flywheel having an annular extension mounted concentrically thereon, means for rotating said flywheel to store energy therein, said means including a driving shaft and a plurality of driving rollers adapted to be wedged against the inner surface of said annular extension in response to the initial rotary movement of said driving shaft, and means for disengaging said rollers from said annular extension to prevent any reverse rotation of the latter from being communicated to said driving shaft.

6. In an engine starter of the type having a driven member adapted to move into mesh with a member of an engine to be started and impart rotary movement thereto in the direction in which said engine normally rotates, means for rotating said driving member including a flywheel and torque transmitting connections between said flywheel and driven member, means for demeshing said driven member in the event of failure of the engine to start in response to transmission of torque through said connections, means responsive to said demeshing action to reverse the direction of rotation of said connections and flywheel, a driving shaft, a one-way clutch engageable to energize the flywheel in response to the initial rotary movement of said driving shaft, and means for completely disengaging said one-way clutch to prevent the above described reverse rotation of the flywheel from being communicated to said driving shaft.

7. In an engine starter of the type having a driven member adapted to move into mesh with a member of an engine to be started, means for rotating said driving member including a driving shaft and torque transmitting connections between said driving shaft and driven member, means for demeshing said driven member in the event of failure of the engine to start, means responsive to said demeshing action to reverse the direction of rotation of said torque transmitting connections, a driving shaft, a one-way clutch engageable to energize the torque transmitting connections in response to initial rotary movement of said driving shaft, and means for completely disengaging said one-way clutch to prevent any reverse rotation of said torque transmitting connections from being communicated to said driving shaft.

8. In a device of the class described, a clutch having a plurality of rollers, a driven element adapted to coact therewith and an inner race provided with depressions to receive said rollers, a series of cam surfaces on said inner race, said cam surfaces corresponding in number to the number of depressions, means responsive to deceleration of said driving shaft to shift said rollers from said surfaces into said depressions, and resilient means acting to facilitate such shift.

9. An over-running clutch including a driven member having a cylindrical bore, a driving member having a cam disposed in said bore provided with alternate cam surfaces and relieved peripheral portions, a retaining ring between said cam and the wall of said bore provided with spaced chambers having open opposite sides registerable with the relieved portions of said cam respectively, a roller in each of said chambers adapted to extend through the open sides thereof and wedge between said cam surfaces and the wall of said bore for establishing a one-way drive between said members, said rollers having a substantially loose fit in said chambers and being partially movable through the inner open sides thereof into the relieved portions of said cam when said open sides register with said relieved portions during over-running of said driven member relative to said driving member, and resilient means bearing between said ring and said driving member for simultaneously urging said rollers toward their over-running positions.

ROMEO M. NARDONE.